(12) United States Patent
von Gutfeld et al.

(10) Patent No.: US 7,006,193 B2
(45) Date of Patent: Feb. 28, 2006

(54) METHOD OF SEALING TWO SUBSTRATES WITH A NON-EPOXY OR EPOXY-ACRYLATE SEALANT USING LASER RADIATION

(75) Inventors: Robert J. von Gutfeld, New York, NY (US); James H. Glownia, Somers, NY (US); Gareth G. Hougham, Ossining, NY (US)

(73) Assignee: Au Optronics Corporation, Hsinchu (TW)

( * ) Notice: Subject to any disclaimer, the term of this patent is extended or adjusted under 35 U.S.C. 154(b) by 250 days.

(21) Appl. No.: 09/917,087

(22) Filed: Jul. 27, 2001

(65) Prior Publication Data

US 2001/0055087 A1    Dec. 27, 2001

Related U.S. Application Data

(63) Continuation-in-part of application No. 09/307,887, filed on May 10, 1999, now Pat. No. 6,636,290.

(51) Int. Cl.
*G02F 1/1339*    (2006.01)

(52) U.S. Cl. .................. 349/190; 438/455; 438/456

(58) Field of Classification Search ............... 349/190, 349/153, 158; 438/30, 118, 455, 456; 156/272.8
See application file for complete search history.

(56) References Cited

U.S. PATENT DOCUMENTS

| | | | |
|---|---|---|---|
| 4,401,537 A * | 8/1983 | Chern et al. ................. 522/31 |
| 4,931,125 A * | 6/1990 | Volkmann et al. ....... 156/272.8 |
| 5,263,888 A | 11/1993 | Ishihara et al. |
| 5,677,749 A * | 10/1997 | Tsubota et al. ............. 349/160 |
| 5,793,461 A * | 8/1998 | Inou ........................... 349/153 |
| 6,179,679 B1 | 1/2001 | von Gutfeld et al. |
| 6,219,126 B1 | 4/2001 | Von Gutfeld |
| 6,222,603 B1 * | 4/2001 | Sakai et al. ................. 349/153 |
| 6,485,599 B1 * | 11/2002 | Glownia et al. ......... 156/272.8 |

FOREIGN PATENT DOCUMENTS

| | | |
|---|---|---|
| JP | 58-173715 | 10/1983 |
| JP | 61-190313 | 8/1986 |
| JP | 03-083012 | 4/1991 |
| JP | 03-269520 | 12/1991 |
| JP | 04-107523 | 4/1992 |

(Continued)

OTHER PUBLICATIONS

U.S. Appl. No. 09/307,887, filed May 10, 1999.
U.S. Appl. No. 09/614,056, filed Jul. 11, 2000.

(Continued)

*Primary Examiner*—Tom Thomas
*Assistant Examiner*—Matthew C Landau
(74) *Attorney, Agent, or Firm*—Jon A. Gibbons; Fleit, Kain, Gibbons, Gutman, Bongini & Bianco P.L.

(57) ABSTRACT

A method of joining two panels during the manufacturing of a LCD display employing the ODF (One Drop Fill) assembly technique. Using this method, the liquid crystal is deposited on one of the substrate's interior to the glue seal. The glue seal is pre-deposited near the peripheral edge of the substrates. The two substrates are then brought in contact with one another. The glue seal must be cured rapidly in order to seal the entire periphery while avoiding contamination between the glue seal, in the liquid state and the liquid crystal. The present invention teaches the use of a non-epoxy glue sealant, which is cured using photoinitiators. Experimental research has discovered the use of photons that are derived from laser beams and the control thereof. This allows for a faster, lower temperature cure.

11 Claims, 4 Drawing Sheets

FOREIGN PATENT DOCUMENTS

| | | |
|---|---|---|
| JP | 06-194615 | 7/1994 |
| JP | 06-208097 | 7/1994 |
| JP | 08-006039 | 1/1996 |
| JP | 08-101395 | 4/1996 |
| JP | 09-033931 | 2/1997 |
| JP | 09-073096 | 3/1997 |
| JP | 10-170929 | 6/1998 |
| JP | 10-177178 | 6/1998 |
| JP | 10-333160 | 12/1998 |

OTHER PUBLICATIONS

U.S. Appl. No. 09/635,661, filed Aug. 10, 2000.
U.S. Appl. No. 09/307,887, filed May 10, 1999.
U.S. Appl. No. 09/425,711, filed Oct. 22, 1999.
U.S. Appl. No. 09/614,056, filed Jul. 11, 2000.

* cited by examiner

METHOD OF SEALING TWO SUBSTRATES WITH A NON-EPOXY OR EPOXY-ACRYLATE SEALANT USING LASER RADIATION

CROSS REFERENCE TO RELATED APPLICATIONS

This is a continuation-in-part of application Ser. No. 09/307,887, entitled "Method of Forming Liquid Display Panels and The Like", filed May 10, 1999, now U.S. Pat. No. 6,636,290. The entire disclosure of prior application Ser. No. 09/307,887 is herein incorporated by reference.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

This invention generally relates to the field of joining two substrates with a sealant, and more particularly the art of using laser radiation for curing the sealant during the manufacturing of LCD (Liquid Crystal Display) panels.

2. Description of the Related Art

LCD displays are manufactured by joining two substrates to one another with liquid crystal material between the two substrates. Both substrates are typically glass. One method for joining the two substrates to form a panel is related to U.S. Pat. No. 5,263,888 by Ishihara et al in which an ODF (One Drop Fill) method for assembling liquid crystal flat panel displays is described. Using this method, the liquid crystal is deposited on one of the substrate's interior to the glue seal. The glue seal is pre-deposited near the peripheral edge of the substrates. The two substrates are brought in contact with one another. The glue seal must be cured rapidly in order to seal the entire periphery. Accordingly, a need exists for a method of curing the glue seal for use in a high quality, high volume but low-cost manufacturing environment.

The strength of the cured sealant holding the two substrates together is also prime consideration. Since the liquid crystal material is inside of the panel prior to cross linking, it is not possible to utilize the standard thermal baking of the glue seal for curing since the temperature required for thermal cross linking generally exceeds the temperature the liquid crystal can tolerate. Accordingly, a need exists for a non-thermal method for curing the sealant material allowing the sealant method to stay below a temperature that is harmful to the liquid crystal material.

Furthermore, the thermal process for curing the sealant generally takes on the order of 1 hour or more. During this time, there is a great chance for intermixing of the non-epoxy glue seal and the liquid crystal, which leads to eventual poisoning of the liquid crystal resulting in severe defects in the operation of the display panel. Accordingly, a need exists for a fast method of curing the sealant, which does not allow sufficient time for intermixing of the glue sealant in a liquid state and the liquid crystal material.

Another method for curing non-epoxy sealant is to incorporate photo initiators in the sealant rather than thermal initiators. Lasers have been shown to offer both speed and efficiency when photo initiators are present in the non-epoxy glue sealant. The use of a laser allows for this efficient light source to rapidly cure the sealant without an unwanted temperature rise extending into the liquid crystal. There are many factors when using lasers that must be considered including the laser frequency, whether the laser is pulsed versus non-pulsed, the power of the laser, and the exposure time and direction of the laser. An attempt must be made here to find several commercially available solutions that will work and yet provide a cost effective manufacturing solution. Accordingly, a need exists for the determination of a viable selection of the type of laser and the exact exposure method.

One disadvantage of non-thermal curing methods is that the light source must have a clear light path to the sealant. LCD panels are constructed with circuit traces that exit the edge of the panel. These circuit traces are used by the display driver to effect the intended image on the panel. However the traces cause blocking or shadowing of the sealant that is under the traces. Accordingly the need exists for a method to allow for the light source to be able to reach the sealant that is under the circuit traces.

SUMMARY OF THE INVENTION

Briefly, according to the present invention, disclosed is a process, and system for joining two substrates to form a panel using a laser to cure a non-epoxy sealant such as an epoxy-acrylate, epoxy-amine, epoxy-urethane, epoxy-alcohol, epoxy-acid and the like, well know to those skilled in the art. The distinction here is that none of the compounds listed here are pure epoxies in terms of organic chemistry. A pulsed laser beam is used to promote the polymerization of the sealant in timely fashion, while not causing a harmful temperature rise to the adjacent glue seal.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1:
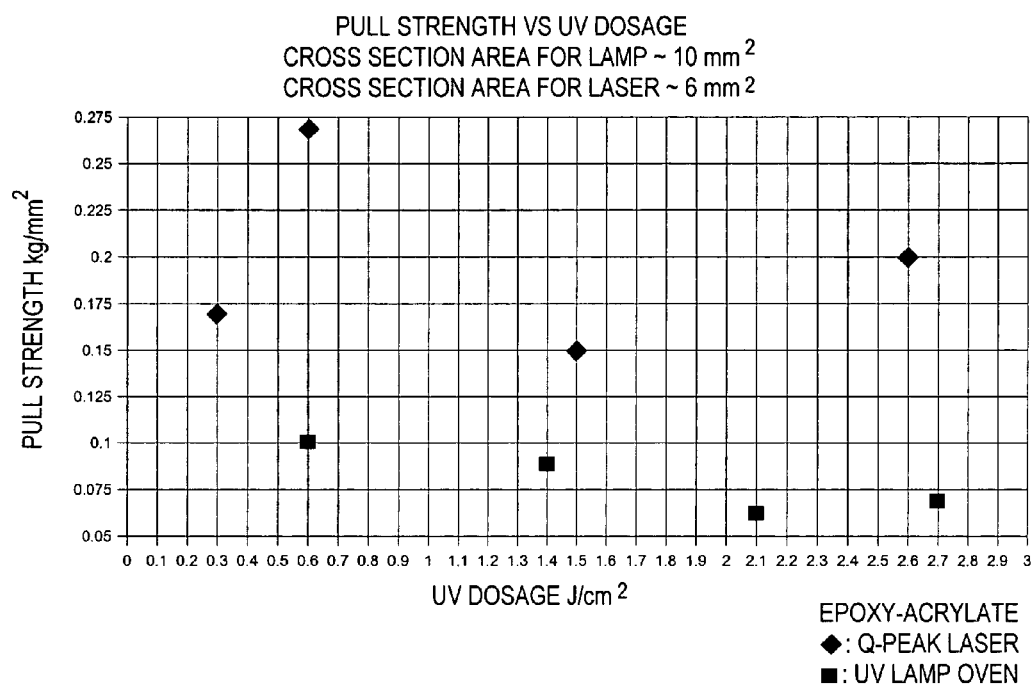
FIG. 1 is a graph of the pull strength versus the UV dosage for a short pulsed laser and a CW UV (Continuous Wave Ultraviolet) lamp for the purposes of curing the sealant of a LCD, according to the present invention.

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Detailed Description of the Process

A method is disclosed to polymerize a non-epoxy glue sealant to rigidly affix two substrates to one another by using laser radiation to activate photo initiators that leads to the cross linking or polymerization of the glue seal. Pull strength data is presented of glass samples affixed to one another with non-epoxy glue seals using the mercury UV lamp and two different short-pulsed lasers. As further described below, sealing the periphery of two substrates using lasers to activate the photo initiators forming a panel already containing the liquid crystal, such as the ODF technique, offers several advantages compared to that which results from using a standard mercury lamp. In another embodiment, thermal initiators are present in the non-epoxy sealant. The thermal initiators lead to sealant curing when sealing occurs by way of increased temperature or baking of the LCD panels.

Experimental Research for Use During the Assembly of LCD Panels

When a UV curable sealant, here limited to non-epoxy sealants such as those previously described, is exposed to UV (Ultraviolet) radiation photo initiators are released. These photo initiators interact with chemical portions of the sealant to cause the sealant to cross-link or polymerize. This is also known as curing. The state of the manufacturing art typically uses UV lamps for irradiation to cause polymerization. It has been determined experimentally that a laser, particularly a UV laser is more efficient than UV lamp irradiation. The laser is incident on one of the UV transparent or near transparent substrates, which is typically glass for the optimum efficiency in curing the sealant. The efficiency is defined here as the pull strength/cross sectional area (CSA) of the glue seal necessary to separate the two substrates. Further defined, the efficiency is the pull strength (the force per unit area of non-epoxy glue sealant) versus the total incident W energy per square cm (fluence).

It has been further determined that pulsed lasers are able to use less total fluence to achieve curing or polymerization compared to UV lamp irradiation thereby leading to a faster cure process and a greater throughput in manufacturing.

In one embodiment several lasers, an excimer XeF pulsed laser and a Q-Peak high repetition laser are most efficient. Both have pulse widths on the order of 10's of nanoseconds and are more efficient than several different UV CW (Continuous Wave) lamp sources normally employed for activating the photo-initiators within the sealant giving rise to a sealant cure or polymerization. However, it also possible to use much shorter pulse width lasers, for example in the femto-second range, so that the over-all pulse width range can vary from femto-second to continuous wave.

Details of the Research

A sealant is applied near the periphery of one substrate to affix the first substrate to a second. At least one of the substrates is mostly transparent to the laser beam radiation. Except in the regions of metalization, which are on the underside of the otherwise transparent substrate. It is this substrate that the polymerzing light is incident on in most cases. In the preferred embodiment, the two substrates are affixed in order to form a liquid crystal display panel. This method is particularly useful when using the ODF (One Drop Fill) method where it is important to minimize the time in which the sealant, in the uncured state and liquid crystal can interact. Given this structure to perform research several UV sources are investigated.

The lasers have been shown by measurements to be superior in the speed of the polymerization step and the bonding strength compared to several focused and unfocused UV lamps which are used as a comparison. In the present invention a laser, preferably a pulsed laser, is used to scan near the periphery of one of the two substrates to be affixed to one another in the region of the non-epoxy glue seal. The laser light is incident on a transparent or nearly transparent substrate with the laser beam approximately normal to the plane of the substrate. While the beam can also enter the substrate at slant angles, that is angles deviating somewhat from the normal direction, the reflective losses will be greater and hence the laser less efficient in transferring the light to the non-epoxy sealant. Never the less the laser can be aimed at an angle off of normal to the top of the substrate, so as to expose the non-epoxy sealant than is under any blocking images. These blocking images include the circuit traces on the underside of the transparent substrate, which are used for the pixel selection. When this technique is used care is taken to account for the reflective losses. That is the laser light impingement angle and power is adjusted so as to assure the correct amount of irradiation into the non-epoxy sealant independent of how the light arrived. Unlike an unfocused UV lamp that floods the target the laser is scanned along the glass targeting the non-epoxy glue seal using scanning mirrors or robotic arms programmed to follow the desired path of the glue seal. Typical non-epoxy glue seals require a fluence on the order of 2–4 $J/cm^2$ to cure or cross link sufficiently for cross linking to be considered complete. Other fluences less than 0.02 $J/cm^2$ may also be used advantageously in the present invention.

Pull Strength UV Dosage for a Lamp and a Q-Peak Laser

FIG. 1 shows experimental data plotted on graph 100 indicating the advantage of using a pulsed laser to polymerize a non-epoxy glue sealant between two small glass samples compared to that of a UV lamp. The abscissa is labeled UV dosage in $J/cm^2$ starting at 0 and ending with 2.9. The ordinate is labeled as pull strength of $kg/mm^2$ starting at 0.05 and ending at 0.275. The pull strength is the force/$mm^2$ required to separate two glass samples. The non-epoxy glue that was used is an epoxy-acrylate glue. The square data points are for the UV lamp which had an output of ~7 $mw/cm^2$ at the sample surface. The diamond data points are for a Q-Peak™ Nd:YLF frequency tripled laser at a repetition rate of 10 kHz. It is observed that for all UV dosages the pull strength of the laser samples is higher then that of the UV lamp.

Pull Strength vs UV Dosage for a Lamp and a Pulsed Excimer Laser

Figure 2:
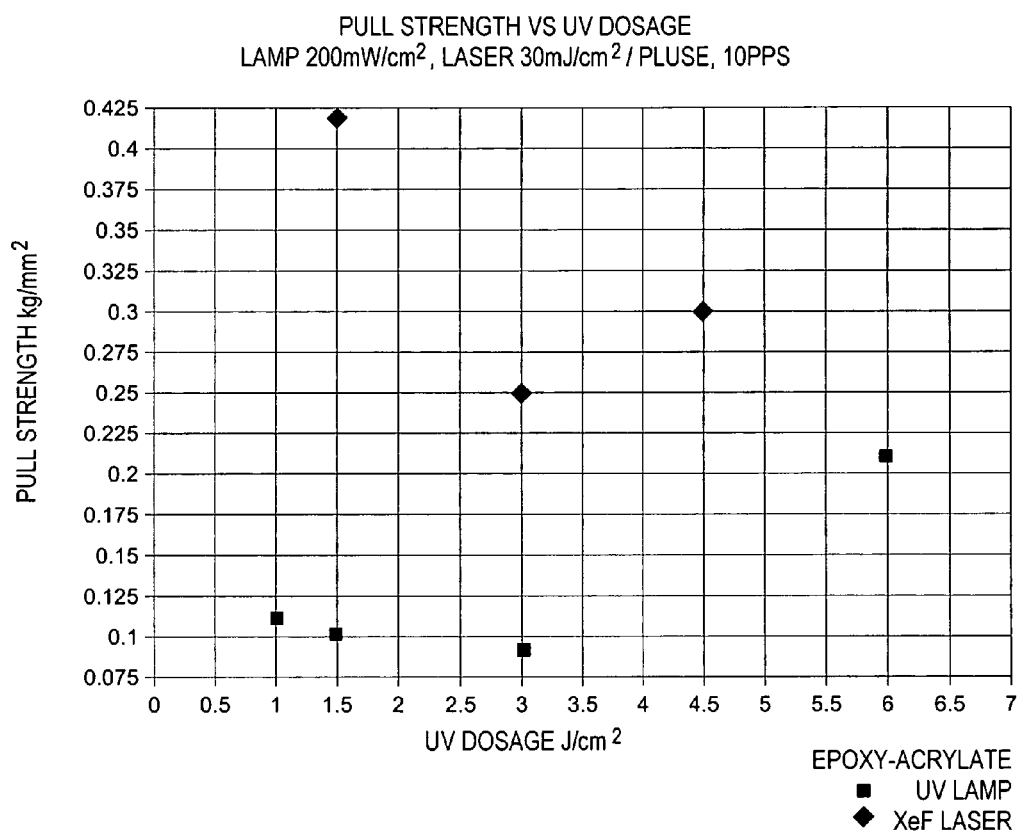
FIG. 2 is a graph of the pull strength versus the irradiation for both a different UV lamp and laser from that used in FIG. 1, here a pulsed UV laser for the purposes of curing the sealant, according to the present invention.

Turning now to FIG. 2 shown is a graph 200 indicating the advantage of using a yet another pulsed laser to polymerize a non-epoxy glue sealant compared to that of an UV lamp. The abscissa is labeled UV Dosage in $J/cm^2$ starting at 0 and ending with 7.0. The ordinate is labeled in pull strength of $kg/mm^2$ starting at 0.075 and ending at 0.4. The pull strength is the force/mm$^2$ required to separate two glass samples. The non-epoxy glue that was used is a second epoxy-acrylate. The square data points are for the UV lamp source with a high power output of 200 mw/cm$^2$. The diamond data points are for a Lambda Physik™ XeF pulsed laser, unfocused, ~10 Hz, with a fluence of 30 mJ/cm$^2$/pulse. It is again observed that for all UV dosages the pull strength of the laser samples are higher that of the UV lamp.

Laser Scanning of Target Substrates

Figure 3:
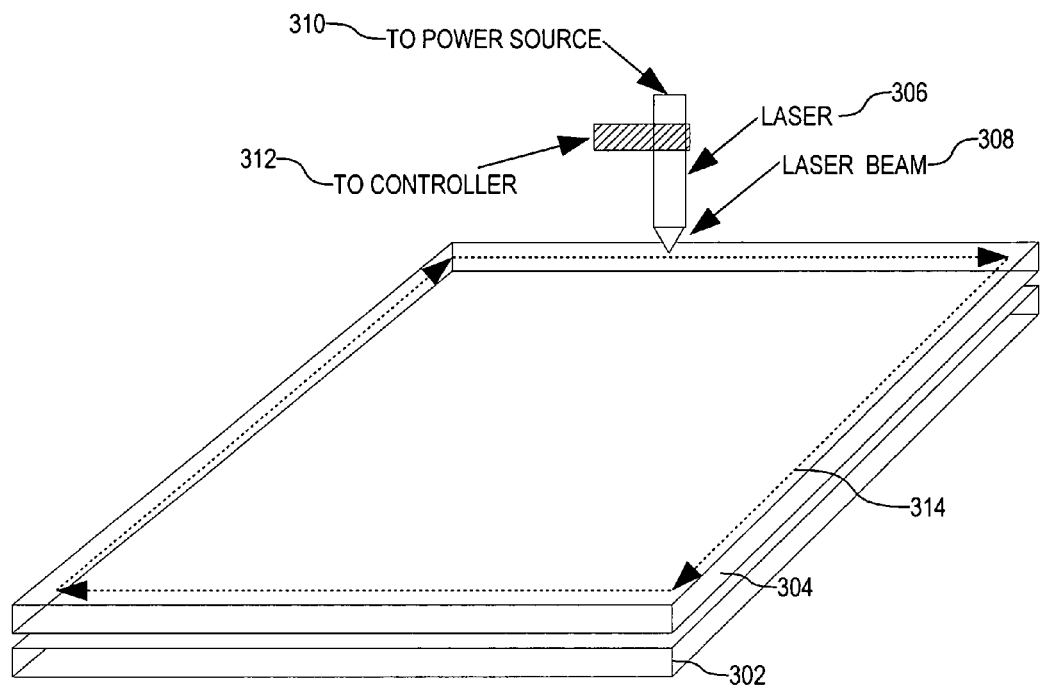
FIG. 3 illustrates the laser scanning of a panel to cure of the non-epoxy glue sealant, according to the present invention.

FIG. 3 is an isometric drawing 300 of two substrates that are affixed to one another 302 and 304 with a non-epoxy glue sealant applied near an outer periphery of one of the two substrates. A laser 306 emits a laser beam 308, which is driven with a power source 310. It is mechanically controlled 312 to scan over the top substrate, which is mostly transparent to the incident laser light to cure the non-epoxy glue sealant. Robotic means are used to move either the laser or the substrate with respect to the laser along the path of the non-epoxy sealant. Alternatively Laser scanning is also achieved through the use of scanning mirrors.

Figure 4:
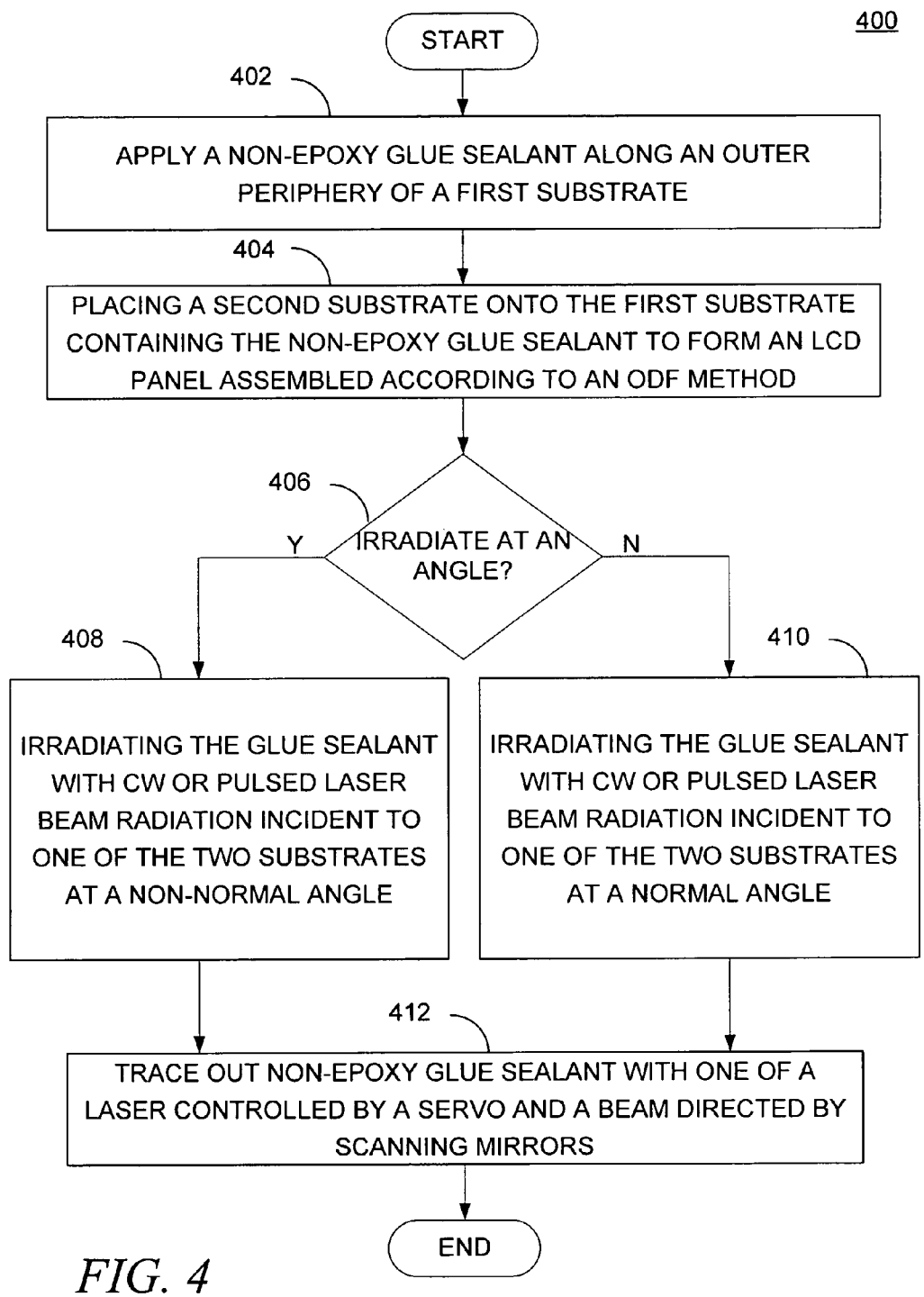
FIG. 4 illustrates a processing flow diagram as performed by an exemplary embodiment of the present invention.

FIG. 4 illustrates an LCD fabrication processing flow diagram 400 performed by an exemplary embodiment of the present invention. The processing flow diagram 400 begins by applying, at step 402, a non-epoxy glue sealant along an outer periphery of a first substrate. The processing then places, at step 404, a second substrate onto the first substrate containing the non-epoxy glue sealant so that an LCD display is created according to a One Drop Fill (ODF) method. The processing then determines, at step 406, if the glue sealant is to be irradiated at an angle. If the irradiation is determined to be performed at an angle, the processing next irradiates, at step 408, the glue sealant with laser beam radiation incident to one of the two substrates at a non-normal angle to polymerize the sealant by directing light onto one of the first or the second substrate that is at least partially transparent to the laser beam. If the irradiation is determined to not be at an angle, the processing next irradiates, at step 410, the glue sealant with laser beam radiation incident to one of the two substrates at a substantially normal angle to polymerize the sealant by directing light onto one of the first or the second substrate that is at least partially transparent to the laser beam. The processing then traces out, at step 412, the non-epoxy glue sealant by using one of a laser controlled by a servo or a laser providing a beam which is directed by scanning mirrors.

Discussion of Photonic Exposure for the Curing Non-Epoxy Sealants

The present invention as would be known to one of ordinary skill in the art could be produced in a several ways. However in one embodiment the invention is implemented using a particular laser and process which taken together are considered a preferred embodiment. The particular process and art have been discovered during experimental research.

According to the inventive principles as disclosed in connection with the preferred embodiment, the invention and the inventive principles are not limited to the particular kind of laser system but may be used with any similar laser light source, as would be known to one of ordinary skill in the art.

The invention is not limited to any particular end product such as a LCD display but may be applied to any similar structure for use in alternate products, as would be known to one of ordinary skill in the art.

Non-Limiting Examples

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for affixing two substrates to one another using a non-epoxy glue sealant containing photoinitiators, the method comprising the steps of:

applying a non-epoxy glue sealant along an outer periphery of a first substrate;

placing a second substrate onto the first substrate containing the non-epoxy glue sealant; and irradiating the glue sealant with laser beam radiation to polymerize the sealant by directing light onto one of the first or the second substrate that is at least partially transparent to the laser beam, wherein the step of irradiating the glue sealant includes irradiating the glue sealant with laser beam irradiation that is incident onto one of the first or the second substrates, so that the laser beam subtends an angle at non-normal incidence with respect to the first or the second substrate receiving the laser beam radiation, enabling the laser directed onto the first or the second substrate to pass through the first or the second substrates onto the non-epoxy glue.

2. A method for affixing two substrates to one another using a non-epoxy glue sealant containing photoinitiators, the method comprising the steps of:

applying a non-epoxy glue sealant along an outer periphery of a first substrate;

placing a second substrate onto the first substrate containing the non-epoxy glue sealant; and irradiating the glue sealant with laser beam radiation to polymerize the sealant by directing light onto one of the first or the second substrate that is at least partially transparent to the laser beam, wherein the step of irradiating the glue sealant includes irradiating the glue sealant with laser beam irradiation from a continuous (CW) laser.

3. The method of claim 2, wherein the step of irradiating the glue sealant includes irradiating the glue sealant with laser beam irradiation from a continuous (CW) laser with a wavelength range 200–1500 nm.

4. A method for affixing two substrates to one another using a non-epoxy glue sealant containing photoinitiators, the method comprising the steps of:

applying a non-epoxy glue sealant along an outer periphery of a first substrate;

placing a second substrate onto the first substrate containing the non-epoxy glue sealant; and irradiating the glue sealant with laser beam radiation to polymerize the sealant by directing light onto one of the first or the second substrate that is at least partially transparent to the laser beam, the laser beam consisting of one of a continuous wave laser and a pulsed laser wherein the first substrate and the second substrate form a LCD (Liquid Crystal Display) panel assembled according to an ODF (One Drop Fill) method and wherein the irradiating of the non-epoxy glue sealant with the laser beam includes providing a UV (Ultraviolet)

dosage into the non-epoxy glue sealant within the LCD panel of not less than 0.02 J/cm 2;

wherein the step of irradiating the non-epoxy glue sealant with a laser includes irradiating with a laser at an impingement angle off of normal to the LCD panel so as to supply a UV dosage of not less than 0.02 J/cm 2 under any blocking images within the LCD panel.

5. The method of claim 4, wherein the step of irradiating the non-epoxy glue sealant with a laser includes irradiating with a laser to expose the photo initiators in the non-epoxy glue sealant using a back side of the LCD panel, wherein the backside of the panel contains no blocking images.

6. The method of claim 4, wherein the step of assembling a first substrate and a second substrate forming a LCD panel using an ODF method with a non-epoxy glue sealant includes forming a LCD panel using an epoxy-acrylate glue sealant.

7. The method of claim 4, wherein the step of irradiating the non-epoxy glue sealant with a laser includes irradiating with laser at a wavelength range of 200–1500 nm.

8. The method of claim 4, wherein the step of irradiating the non-epoxy glue sealant with a laser includes irradiating with a continuous laser at wavelength range 200–1500 nm.

9. A method for affixing two substrates to one another using a non-epoxy glue sealant containing photoinitiators, the method comprising the steps of:

applying a non-epoxy glue sealant along an outer periphery of a first substrate;

placing a second substrate onto the first substrate containing the non-epoxy glue sealant; and irradiating the glue sealant with laser beam radiation to polymerize the sealant by directing light onto one of the first or the second substrate that is at least partially transparent to the laser beam, the laser beam consisting of one of a continuous wave laser and a pulsed laser wherein the first substrate and the second substrate form a LCD (Liquid Crystal Display) panel assembled according to an ODF (One Drop Fill) method and wherein the irradiating of the non-epoxy glue sealant with the laser beam includes providing a UV (Ultraviolet) dosage into the non-epoxy glue sealant within the LCD panel of not less than 0.02 J/cm 2;

wherein the step of irradiating the non-epoxy glue sealant with a laser includes irradiating with a Nd:YLF frequency tripled pulsed laser.

10. A method for affixing two substrates to one another using a non-epoxy glue sealant containing photoinitiators, the method comprising the steps of:

applying a non-epoxy glue sealant along an outer periphery of a first substrate;

placing a second substrate onto the first substrate containing the non-epoxy glue sealant; and irradiating the glue sealant with laser beam radiation to polymerize the sealant by directing light onto one of the first or the second substrate that is at least partially transparent to the laser beam, the laser beam consisting of one of a continuous wave laser and a pulsed laser wherein the first substrate and the second substrate form a LCD (Liquid Crystal Display) panel assembled according to an ODF (One Drop Fill) method and wherein the irradiating of the non-epoxy glue sealant with the laser beam includes providing a UV (Ultraviolet) dosage into the non-epoxy glue sealant within the LCD panel of not less than 0.02 J/cm 2.

11. A method for affixing two substrates to one another using a non-epoxy glue sealant containing photoinitiators, the method comprising the steps of:

applying a non-epoxy glue sealant along an outer periphery of a first substrate;

placing a second substrate onto the first substrate containing the non-epoxy glue sealant; and irradiating the glue sealant with laser beam radiation to polymerize the sealant by directing light onto one of the first or the second substrate that is at least partially transparent to the laser beam wherein the first substrate and the second substrate form a LCD (Liquid Crystal Display) panel assembled according to an ODF (One Drop Fill) method and wherein the irradiating of the non-epoxy glue sealant with the laser beam includes providing a UV (Ultraviolet) dosage into the non-epoxy glue sealant within the LCD panel of not less than 0.02 J/cm 2, and wherein the step of irradiating the non-epoxy glue sealant with a laser includes irradiating with at least one of a laser controlled by a servo to trace out the pattern of the non-epoxy glue sealant to deliver not less than 0.02 J/cm 2 to the non-epoxy glue sealant and a laser providing a beam which is directed by scanning mirrors to deliver not less than 0.02 J/cm 2 by directing the laser beam to trace out the pattern of the non-epoxy glue sealant.

* * * * *